US007350135B2

(12) United States Patent
Kim

(10) Patent No.: US 7,350,135 B2
(45) Date of Patent: Mar. 25, 2008

(54) CHECKSUM WRITING METHOD AND CHECKSUM CHECKING APPARATUS

(75) Inventor: Jin-hun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 603 days.

(21) Appl. No.: 10/775,025

(22) Filed: Feb. 10, 2004

(65) Prior Publication Data

US 2004/0230864 A1 Nov. 18, 2004

(30) Foreign Application Priority Data

Feb. 11, 2003 (KR) .................. 10-2003-0008459

(51) Int. Cl.
*G11C 29/00* (2006.01)
(52) U.S. Cl. ..................... 714/766; 714/807
(58) Field of Classification Search ............. 714/758, 714/766, 807
See application file for complete search history.

(56) References Cited

U.S. PATENT DOCUMENTS

| 5,493,649 | A | * | 2/1996 | Slivka et al. ............ 714/48 |
| 5,663,952 | A | * | 9/1997 | Gentry, Jr. ............. 714/758 |
| 6,098,194 | A | * | 8/2000 | Rinne et al. ............ 714/807 |
| 6,324,661 | B1 | * | 11/2001 | Gerbault et al. ......... 714/718 |
| 6,438,056 | B2 | * | 8/2002 | Aue ..................... 365/222 |
| 6,643,821 | B2 | * | 11/2003 | Karim et al. ........... 714/801 |
| 2003/0076794 | A1 | * | 4/2003 | Kawasaki et al. ........ 370/329 |

FOREIGN PATENT DOCUMENTS

JP 62-1043 1/1987

OTHER PUBLICATIONS

Saxena et al., Analysis of Checksums, Extended-Precision Checksums and Cyclic Redundancy Checks, Jul. 1990, IEEE, vol. 39., pp. 969-975.*

* cited by examiner

*Primary Examiner*—Mujtaba K. Chaudry
(74) *Attorney, Agent, or Firm*—Staas & Halsey LLP

(57) ABSTRACT

A more convenient checksum writing method and checksum checking apparatus. The method includes: calculating a first checksum by reading values from the memory and summing the read values; calculating a first mode checksum by subtracting values written in a predetermined area of the memory from the first checksum; initializing a second checksum to be zero if the first mode checksum does not meet a predetermined condition; calculating a second mode checksum by inverting the second checksum and adding the inverted second checksum to the first mode checksum; and writing the inverted second checksum value in the predetermined area of the memory, if the second mode checksum is equal to the second checksum.

23 Claims, 3 Drawing Sheets

FIG. 3

```
                30                                              31
                ↙                       ⋮                       ↙
0003ffa0h: FF FF FF FF FF FF FF FF FF FF FF FF FF FF FF FF
0003ffb0h: FF FF FF FF FF FF FF FF FF FF FF FF FF FF FF FF
0003ffc0h: FF FF FF FF FF FF FF FF FF FF FF FF FF FF FF FF
0003ffd0h: FF FF FF FF FF FF FF FF FF FF FF FF FF FF FF FF
0003ffe0h: FF FF FF FF FF FF FF FF FF FF FF FF FF FF FF FF
0003fff0h: FF FF FF FF FF FF FF FF D3 FD FF FF FF (FF)(FF)(FF)
                                                    ↑   ↑   ↑
                                                    C   A   B
```

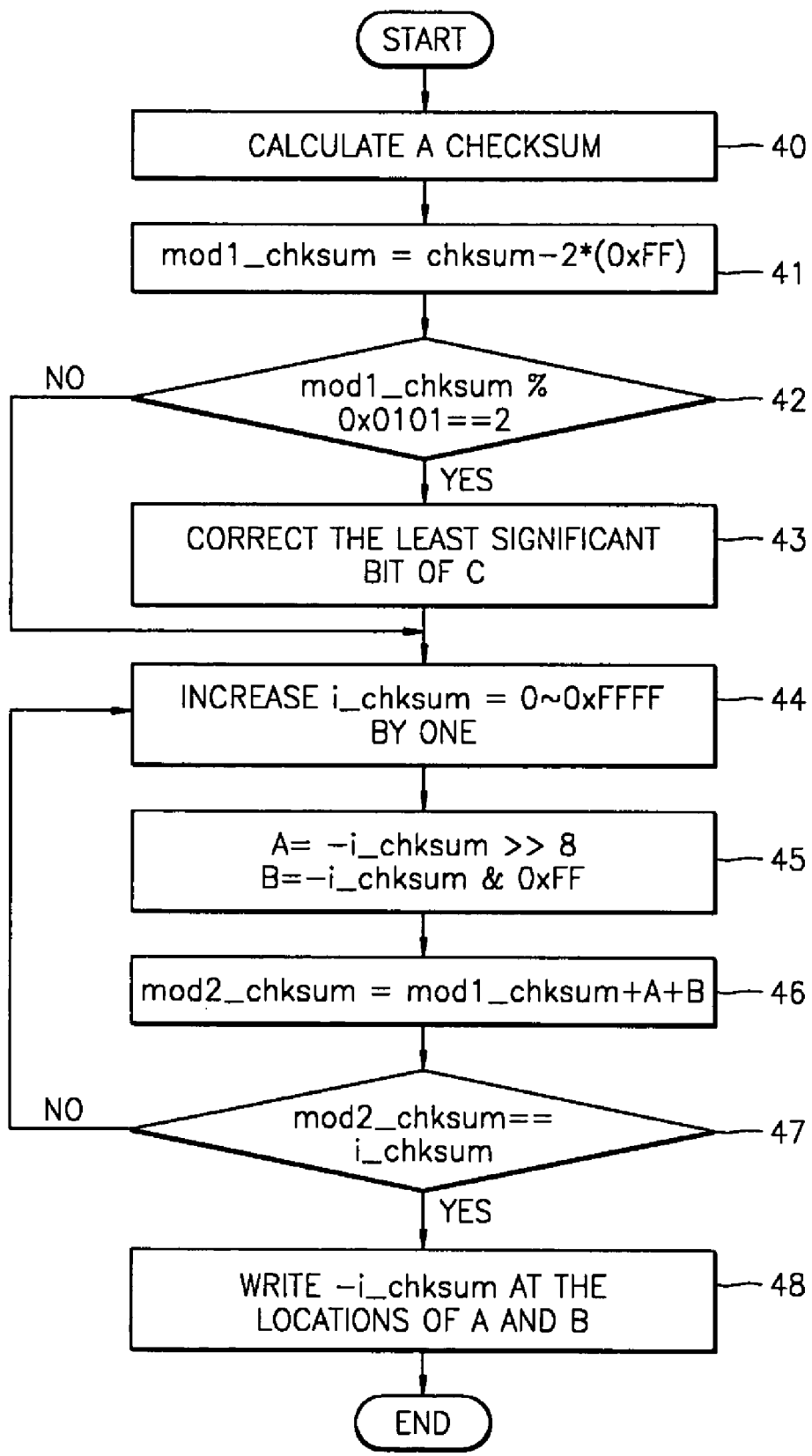

CHECKSUM WRITING METHOD AND CHECKSUM CHECKING APPARATUS

CROSS-REFERENCE TO RELATED APPLICATIONS

This application claims the benefit of Korean Patent Application No. 2003-8459, filed on Feb. 11, 2003, in the Korean Intellectual Property Office, the disclosure of which is incorporated herein in its entirety by reference.

BACKGROUND OF THE INVENTION

1. Field of the Invention

The present invention relates to a checksum writing method and a checksum checking apparatus, and more specifically, to a method of calculating and writing a checksum for a memory and an apparatus which checks a checksum used in a system having a microcomputer and a memory.

2. Description of the Related Art

Generally, an apparatus that uses a microcomputer also uses a programmable storage medium, such as a ROM or flash memory. When a problem arises in an apparatus or it is necessary to check information on programs in the memory, a checksum is checked.

Previously, in order to check if the checksum was correct, the apparatus had to be dismantled and a checksum value printed on the outside of the memory had to be verified. A considerable amount of time is required to dismantle and reassemble an apparatus, and moreover the apparatus or product may be damaged.

Therefore, it would be beneficial to write and check a checksum in a memory without dismantling the associated apparatus.

SUMMARY OF THE INVENTION

The present invention provides a method of calculating a checksum of data stored in a memory and writing the calculated checksum in a predetermined area of the memory, and an apparatus for performing the method.

According to an aspect of the present invention, there is a method of calculating and writing a checksum in a memory, the method comprising: calculating a first checksum by reading values from the memory using a predetermined unit and summing the read values; calculating a first mode checksum by subtracting values written in a predetermined area of memory from the first checksum; initializing a second checksum to be zero if the first mode checksum does not meet a predetermined condition; calculating a second mode checksum by inverting the second checksum and adding the inverted second checksum to the first mode checksum; and writing the inverted second checksum value in the predetermined area of the memory, if the second mode checksum is equal to the second checksum.

The terms "invert" and "inverted" as used above, and throughout the specification and claims, refer to inverting the sign of a value by multiplying the value by −1. For example, using the terms as here defined, the inverted value of X is −X, and the inverted value of −X is X.

According to another aspect of the present invention, there is an apparatus for checking a checksum comprising: a memory that stores a predetermined program and a checksum in the memory; a microcomputer that performs the program stored in the memory, inverts the checksum stored in the memory and outputs the inverted checksum from the memory; and a checksum calculator that computes and writes a checksum in the memory by: calculating a first checksum by reading values from the memory using a predetermined unit and summing the read values; calculating a first mode checksum by subtracting values written in a predetermined area of the memory from the first checksum; initializing a second checksum to be zero if the first mode checksum does not meet a predetermined condition; calculating a second mode checksum by inverting the second checksum and adding the inverted second checksum to the first mode checksum; and writing the inverted second checksum value in the predetermined area of the memory, if the second mode checksum is equal to the second checksum.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 shows data stored at the end portion of a memory; and

FIG. 4 is a flow chart showing a checksum writing method according an embodiment of to the present invention.

DETAILED DESCRIPTION OF THE PREFERRED EMBODIMENTS

Figure 1:
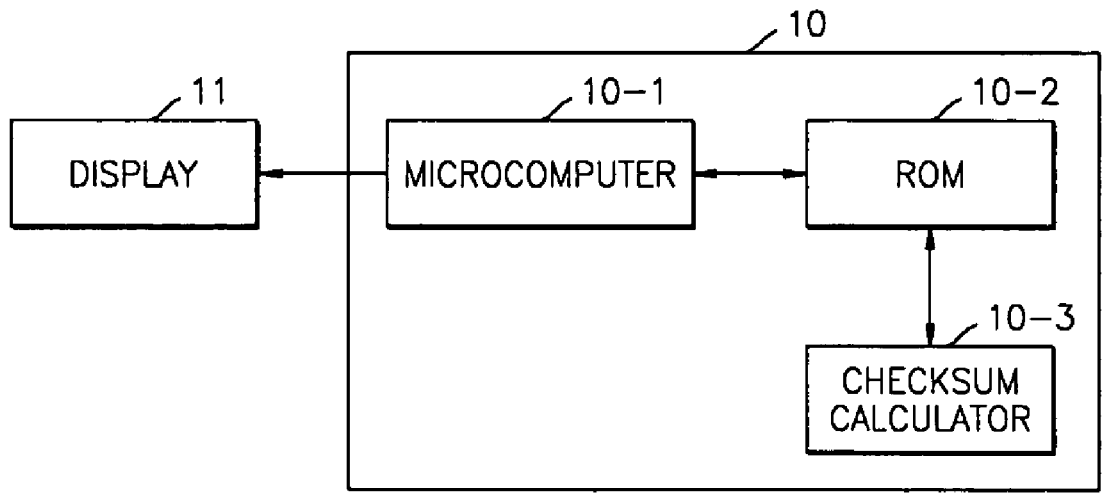
FIG. 1 is a block diagram showing a checksum checking apparatus according an embodiment of to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, a checksum calculation method and a checksum checking apparatus according to embodiments of the present invention will be described in detail with reference to the attached drawings.

FIG. 1 is a block diagram of a checksum checking apparatus according to an embodiment of the present invention. The checksum checking apparatus shown in FIG. 1 includes a device 10 having a microcomputer 10-1, a memory 10-2 (shown here, by way of example, as ROM), a checksum calculator 10-3, and a display 11. The microcomputer 10-1 reads programs stored in the memory 10-2 and performs operations corresponding to those programs. The checksum calculator 10-3 reads data stored in the memory 10-2, calculates a checksum, and stores the calculated checksum in a predetermined area of memory 10-2. The microcomputer 10-1 can read a checksum stored in the memory 10-2 and display the checksum on the display 11 outside the device 10 at the request of a user. Here, light emitting diodes (LEDs) or an on-screen-display (OSD) can be used as the display 11.

Figure 2:
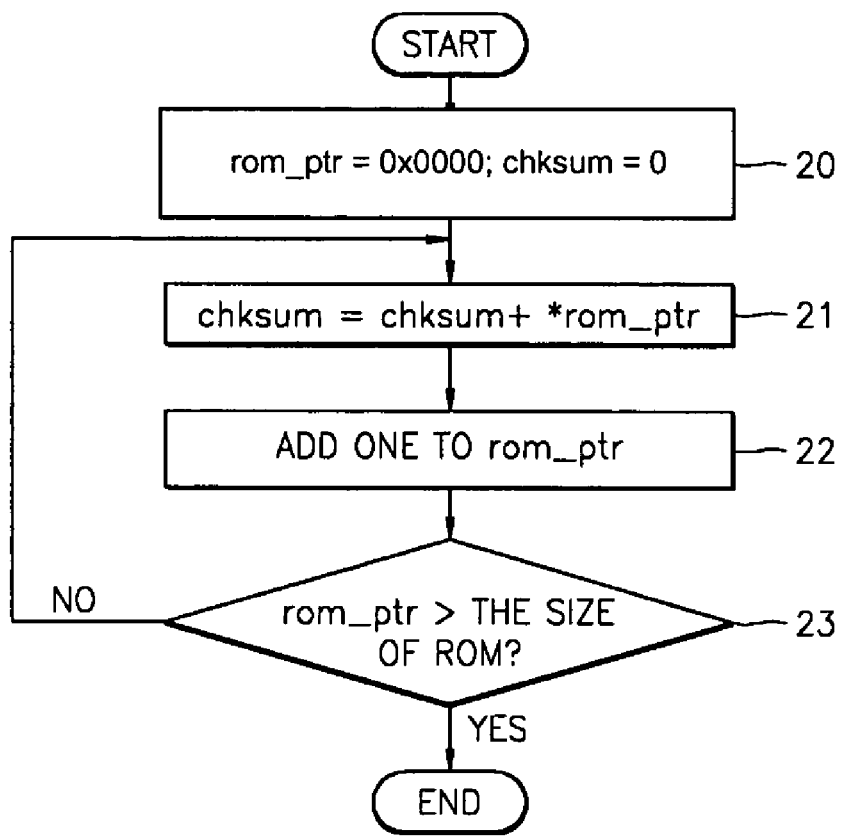
FIG. 2 is a flow chart showing a general checksum calculation method.

The operation of the checksum calculator 10-3 will now be explained by referring to the checksum calculation method shown in FIGS. 2 and 4. FIG. 3 shows the end portion of a memory with data stored therein.

The checksum calculator 10-3 calculates a checksum by reading data stored in the memory byte by byte. In operation 20 in FIG. 2, a ROM pointer (rom_ptr) indicating a memory address is set to zero and a checksum (chksum) is initialized to zero. For reference, numbers beginning with 0x or ending with "h" in FIGS. 2 through 4 indicate hexadecimal values. In operation 21, a new checksum (chksum) is calculated by adding an existing checksum value (chksum) to a value (*rom_ptr) written in an address pointed to by the ROM pointer. Next, in operation 22, a value of the ROM pointer is increased by one. Then, in operation 23, if the increased value of the ROM pointer is less than or equal to the total size of the memory, operations 21 through 23 are repeated.

If the increased value of the ROM pointer is greater than the total size of the memory, the checksum calculated in the previous operation is stored in a predetermined area of the memory 10-2, for example, in the last two bytes, A and B, as shown in FIG. 3. In FIG. 3, reference numerals 30 and 31 indicate an address and a data-written portion, respectively. Typically, the end portion of the memory shown in FIG. 3 is empty. Therefore, if a checksum is written at the last two bytes of memory, the checksum can be checked without dismantling the apparatus.

However, writing the checksum in the last two bytes of the memory causes the internal checksum value for the entire memory to be changed. Therefore, several additional bytes are needed to correct the changed checksum value.

Accordingly, a method of writing a checksum without changing the checksum for the entire memory is required. FIG. 4 is a flow chart showing such a method. A first checksum (chksum) of the whole memory is calculated in operation 40 according to the method of FIG. 2. Next, a first mode checksum (mod1_chksum) is calculated by subtracting the checksum calculated in FIG. 2 (2*(0xFF)), stored as an example in A and B of FIG. 3, from the calculated first checksum in operation 41. Then, in operation 42, if modulo-calculating the first mode checksum (mod_chksum) by 257 (0x0101) results in a value of 2, the least significant bit of the byte expressed as C in FIG. 3 is corrected in operation 43. For example, if a value stored in C is 0xFF, it is corrected to be 0xFE. This indicates that every $258^{th}$ data value, starting from 0, out of a total of 65536 values should be corrected. In operation 44, a second checksum (i_chksum), initially having a value of 0, is increased by one. The second checksum (i_chksum) is then inverted. Then, as shown in operation 45 in FIG. 4, a higher byte value of the inverted second checksum is substituted for the value in A and a lower byte value of the same checksum is substituted with the value stored in B. In operation 46, the byte values stored in A and B are added to the first mode checksum of operation 41 and this added value is defined as a second mode checksum (mod2_chksum) in order to be distinguished from the first mode checksum of operation 41. In operation 47, if the second checksum (i_chksum) is the same as the second mode checksum (mod2_chksum) the inverted second checksum is written to A and B in operation 48. If the above two values are not the same in operation 47, the present second checksum value is increased by one and operations 45 to 47 are repeated until the second checksum becomes 0xFFFF.

If a checksum is checked later, the inverted second checksum written in A and B of the memory is read and then inverted to check if the checksum is normal. That is, the result obtained by check-summing the inverted second checksum (−i_chksum) written in the last two bytes and values written in bytes other than the last two bytes of memory becomes the second checksum (i_chksum). Thus, later checksum checking can be done by re-inverting the inverted second checksum written in the last two bytes and outputting the re-inverted value. This checksum value can be shown on the display 11 of FIG. 1.

According to the present invention, a checksum can be written and then checked more easily without dismantling the apparatus, which allows for more convenient writing and checking of the checksum, since two bytes, or only two bytes plus one bit for 256 cases among empty portions in the memory are additionally required when writing the checksum in the memory.

The present invention may be embodied as a computer code, which can be read by a computer, on a computer readable recording medium. The computer readable recording medium includes all manner and types of recording apparatuses on which computer readable data are stored.

The computer readable medium includes at least storage media such as magnetic storage media (e.g., ROM's, floppy disks, hard disks, etc.), optically readable media (e.g., CD-ROMs, DVDs, etc.), and carrier waves (e.g., transmissions over the Internet). The computer readable medium may be, for example, a computer readable recording medium. Also, the computer readable recording medium can be distributed to computer systems connected through a network and can be stored and executed as a computer readable code in a distributed mode.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of calculating and writing a checksum in a memory, comprising:
    calculating a first checksum by reading a set of first values from the memory and summing the read values, and storing the first checksum;
    calculating a first mode checksum by subtracting a second value written in a predetermined area of the memory from the first checksum;
    initializing a second checksum to be zero when the first mode checksum does not meet a predetermined condition;
    calculating a second mode checksum by inverting the second checksum, adding the inverted second checksum to the first mode checksum; and
    writing the inverted second checksum value in the predetermined area of the memory, when the second mode checksum is equal to the second checksum.

2. The method of claim 1, further comprising increasing the second checksum by one and then repeating the calculating of the second mode checksum and the subsequent increasing of the second checksum by one, when the second mode checksum is not the same as the second checksum.

3. The method of claim 1, wherein the predetermined condition in initializing the second checksum is a function of modulo calculating the first checksum by a first value to generate a modulo calculated value.

4. The method of claim 3, wherein the initializing the second checksum comprises correcting a bit value located immediately prior to the written area of the inverted second checksum value, when the predetermined condition is met.

5. The method of claim 2, wherein the initializing the second checksum comprises correcting a bit value located immediately prior to an entry area of the inverted second checksum value, when the predetermined condition is met.

6. The method of claim 1, wherein the initializing the second checksum comprises correcting a bit value located just before the written area of the inverted second checksum value, when the predetermined condition is met.

7. The method of claim 1, further comprising inverting and outputting the second value written in the predetermined area when checking the checksum in the memory.

8. The method of claim 1, further comprising selectively displaying at least one of the first checksum, the first mode checksum, the second checksum, and the second mode checksum on a display that is external to the memory.

9. The method of claim 1, wherein the predetermined area of the memory in which the inverted second checksum value is written is a last two bytes of the memory.

10. An apparatus for checking a checksum, comprising:
   a memory that stores a predetermined program and a checksum;
   a microcomputer that executes the predetermined program stored in the memory, reads the checksum stored in the memory, inverts the checksum read from the memory, and outputs the inverted checksum; and
   a checksum calculator that calculates and writes the checksum into the memory by:
   calculating a first checksum by reading a set of first values from the memory and summing the read values, and storing the first checksum,
   calculating a first mode checksum by subtracting a second value written in a predetermined area of the memory from the first checksum,
   initializing a second checksum to be zero when the first mode checksum does not meet a predetermined condition,
   calculating a second mode checksum by inverting the second checksum and adding the inverted second checksum to the first mode checksum; and
   when the second mode checksum is equal to the second checksum, writing the inverted second checksum value in the predetermined area of the memory.

11. The apparatus of claim 10, wherein the checksum calculator increases the second checksum by one and repeats the calculating of the second mode checksum and the subsequent increasing of the second checksum by one, when the second mode checksum is not equal to the second checksum.

12. The apparatus of claim 10, wherein the predetermined condition is that the result of modulo calculating a first checksum by one of the first values is a modulo calculated value.

13. The apparatus of claim 12, wherein the checksum calculator corrects a bit value located immediately prior to the predetermined area of the memory on which the inverted second checksum value is written.

14. The apparatus of claim 11, wherein the checksum calculator corrects a bit value located immediately prior to the predetermined area of the memory on which the inverted second checksum value is written.

15. The apparatus of claim 10, wherein the checksum calculator corrects a bit value located immediately prior to the predetermined area of the memory on which the inverted second checksum is written.

16. The apparatus of claim 10, further comprising a display to selectively display at least one of the first checksum, the first mode checksum, the second checksum, the second mode checksum, and the inverted second mode checksum.

17. The apparatus of claim 16, wherein the display is an LED display.

18. The apparatus of claim 16, wherein the display is an on-screen display.

19. The apparatus of claim 10, wherein the memory is a ROM.

20. The apparatus of claim 10, wherein the predetermined area of the memory in which the inverted second checksum value is written is a last two bytes of the memory.

21. The apparatus of claim 10, wherein the checksum is written and checked without dismantling the apparatus.

22. A computer readable medium on which a program implementing a method of calculating and writing a checksum in a memory is stored, the program causing a computer to execute the method, wherein the method comprises:
   calculating a first checksum by reading a set of first values from the memory and summing the read values, and storing the first checksum;
   calculating a first mode checksum by subtracting a second value written in a predetermined area of the memory from the first checksum; and
   initializing a second checksum to be zero when the first mode checksum does not meet a predetermined condition;
   calculating a second mode checksum by inverting the second checksum and adding the inverted second checksum to the first mode checksum; and
   writing the inverted second checksum value in the predetermined area of the memory, when the second mode checksum is equal to the second checksum.

23. The computer readable medium of claim 22, wherein the computer readable medium is distributed to a computer system connected through a network and is stored and executed as a computer readable code in a distributed mode.

* * * * *

UNITED STATES PATENT AND TRADEMARK OFFICE
CERTIFICATE OF CORRECTION

PATENT NO. : 7,350,135 B2  Page 1 of 1
APPLICATION NO. : 10/775025
DATED : March 25, 2008
INVENTOR(S) : Jin-hun Kim It is certified that error appears in the above-identified patent and that said Letters Patent is hereby corrected as shown below:

First Page, Column 2 (Other Publications), Line 3, change "39.," to --39,--.

Signed and Sealed this

Second Day of September, 2008

JON W. DUDAS
*Director of the United States Patent and Trademark Office*